(12) United States Patent
Helton

(10) Patent No.: US 8,619,417 B1
(45) Date of Patent: Dec. 31, 2013

(54) WATER-RESISTANT COMPUTER DOCKING STATION

(75) Inventor: Justin R. Helton, Fredericksburg, VA (US)

(73) Assignee: The United States of America as Represented by the Secretary of the Navy, Washington, DC (US)

( * ) Notice: Subject to any disclaimer, the term of this patent is extended or adjusted under 35 U.S.C. 154(b) by 234 days.

(21) Appl. No.: 13/373,243

(22) Filed: Nov. 8, 2011

(51) Int. Cl.
*G06F 1/16* (2006.01)
*G06F 1/20* (2006.01)
*H05K 5/00* (2006.01)
*H05K 7/00* (2006.01)

(52) U.S. Cl.
USPC .................................................. 361/679.41

(58) Field of Classification Search
None
See application file for complete search history.

(56) References Cited

U.S. PATENT DOCUMENTS

| | | | | | |
|---|---|---|---|---|---|
| 4,742,478 | A | * | 5/1988 | Nigro et al. | 361/679.09 |
| 5,107,400 | A | * | 4/1992 | Kobayashi | 361/679.37 |
| 5,159,533 | A | * | 10/1992 | Kuang | 361/679.43 |
| 5,535,093 | A | * | 7/1996 | Noguchi et al. | 361/679.43 |
| 5,704,212 | A | * | 1/1998 | Erler et al. | 62/3.2 |
| 5,710,728 | A | * | 1/1998 | Danielson et al. | 713/321 |
| 5,784,253 | A | * | 7/1998 | Ooka et al. | 361/679.43 |
| RE36,381 | E | * | 11/1999 | Boyle et al. | 361/679.41 |
| 6,179,122 | B1 | * | 1/2001 | Moncrief et al. | 206/320 |
| 6,185,095 | B1 | | 2/2001 | Helot et al. | 361/686 |
| 6,208,508 | B1 | * | 3/2001 | Ruch et al. | 361/679.55 |
| 6,276,448 | B1 | * | 8/2001 | Maruno | 165/185 |
| 6,301,103 | B1 | * | 10/2001 | Abboud | 361/679.6 |
| 6,353,536 | B1 | * | 3/2002 | Nakamura et al. | 361/679.41 |
| 6,404,626 | B1 | * | 6/2002 | Low et al. | 361/679.41 |
| 6,426,872 | B1 | * | 7/2002 | Sutton et al. | 361/679.41 |
| 6,525,932 | B1 | * | 2/2003 | Ohnishi et al. | 361/679.41 |
| 6,583,985 | B2 | * | 6/2003 | Nguyen et al. | 361/679.27 |
| 6,605,924 | B2 | * | 8/2003 | Tanaka et al. | 320/113 |
| 6,646,874 | B2 | * | 11/2003 | Pokharna et al. | 361/679.09 |
| 6,657,857 | B2 | * | 12/2003 | Lan | 361/679.33 |
| 6,665,176 | B2 | * | 12/2003 | Amemiya et al. | 361/679.21 |
| 6,781,825 | B2 | * | 8/2004 | Shih et al. | 361/679.58 |
| 6,896,134 | B2 | * | 5/2005 | Russell et al. | 206/320 |
| 7,009,840 | B2 | * | 3/2006 | Clark et al. | 361/679.41 |
| 7,298,611 | B1 | * | 11/2007 | Carnevali et al. | 361/679.55 |
| 7,342,783 | B2 | * | 3/2008 | Park | 361/679.48 |
| 7,362,567 | B1 | * | 4/2008 | Hsieh et al. | 361/679.41 |
| 7,573,707 | B2 | | 8/2009 | Kuo | 361/679.41 |
| 7,733,642 | B2 | * | 6/2010 | Liou et al. | 361/679.41 |
| 7,755,890 | B2 | * | 7/2010 | Rui et al. | 361/679.55 |

(Continued)

OTHER PUBLICATIONS

U.S. Appl. No. 12/925,391, filed Sep. 29, 2010, Walder.

(Continued)

*Primary Examiner* — Jinhee Lee
*Assistant Examiner* — Xanthia C Cunningham
(74) *Attorney, Agent, or Firm* — Gerhard W. Thielman, Esq.

(57) ABSTRACT

A computer docking station is provided having an enclosure unit, a cable-to-panel connector, a dock cover, an electrical connector that includes an open box configuration; and a cable-to-panel component. The enclosure unit connects to the docking station. The dock cover is disposed inside the enclosure unit. The electrical connector is also disposed inside the enclosure unit and connects to the dock cover. The electrical connector comprises connectors to enable electrical connections to peripheral devices, a mounting plate positioned over the enclosure unit, a docking connector operatively connected to the dock cover and extending through the mounting plate, and a plurality of gaskets connected to the mounting plate.

13 Claims, 4 Drawing Sheets

(56) References Cited

U.S. PATENT DOCUMENTS

| | | | |
|---|---|---|---|
| 8,072,747 B2 * | 12/2011 | Yao et al. | 361/679.43 |
| 2001/0009502 A1 * | 7/2001 | Ohnishi | 361/686 |
| 2003/0184958 A1 * | 10/2003 | Kao | 361/683 |
| 2003/0231465 A1 * | 12/2003 | Weng | 361/686 |
| 2004/0120112 A1 * | 6/2004 | Mullen et al. | 361/686 |
| 2006/0181840 A1 * | 8/2006 | Cvetko | 361/679 |
| 2008/0055844 A1 * | 3/2008 | Kobayashi et al. | 361/686 |
| 2008/0266783 A1 * | 10/2008 | Mills et al. | 361/686 |
| 2009/0009945 A1 * | 1/2009 | Johnson et al. | 361/681 |
| 2009/0213536 A1 * | 8/2009 | Lewandowski et al. | 361/679.43 |
| 2010/0067189 A1 * | 3/2010 | Hung | 361/679.41 |
| 2010/0067190 A1 * | 3/2010 | Yu | 361/679.41 |
| 2010/0149748 A1 * | 6/2010 | Lam | 361/679.41 |
| 2010/0265652 A1 * | 10/2010 | Agata et al. | 361/679.41 |
| 2011/0075351 A1 * | 3/2011 | Tarnoff | 361/679.43 |
| 2012/0014056 A1 * | 1/2012 | Chen et al. | 361/679.41 |
| 2012/0170203 A1 * | 7/2012 | Oberpriller et al. | 361/679.41 |

OTHER PUBLICATIONS

Panasonic Cradles & Docking Stations http://www.gamberjohnson.com/pdf/request_quote_1.1/07_panasonic_solutions.pdf.

Gamber Johnson brochure http://pcsmobile.blueboltlive.com/Portals/0/docs/Spec%20Sheets/panasonic%20compatibility%20trifold.pdf.

* cited by examiner

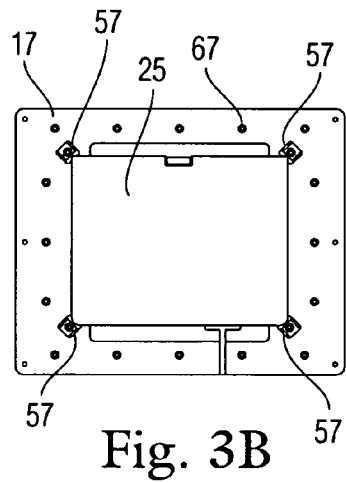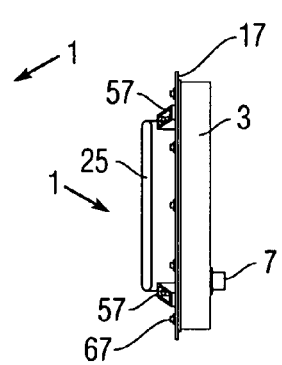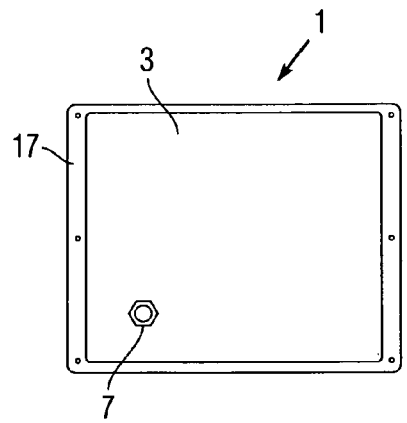
Fig. 3B        Fig. 3C        Fig. 3D
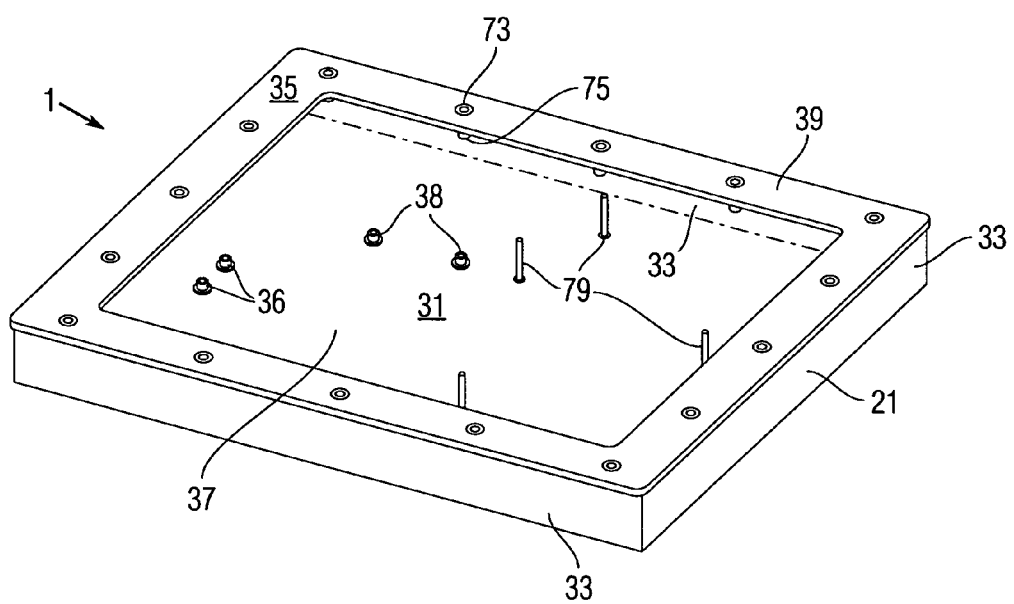
Fig. 4

WATER-RESISTANT COMPUTER DOCKING STATION

GOVERNMENT INTEREST

The invention described by various exemplary embodiments was made in the performance of official duties by one or more employees of the Department of the Navy, and thus, the invention herein may be manufactured, used or licensed by or for the Government of the United States of America for governmental purposes without the payment of any royalties thereon or therefor.

BACKGROUND

1. Technical Field

The embodiments herein generally relate to computer assemblies, and, more particularly, to computer docking stations used in ruggedized computing environments.

2. Description of the Related Art

Conventional computer docking stations allow a laptop computer to connect to peripheral devices such as power sources, monitors, keyboards, mice, telephones, printers, etc. A docking station can allow a laptop computer to behave as a desktop or workstation by allowing multiple peripheral devices to be quickly and easily connected to the laptop through the docking station thereby permitting quick connection of the laptop computer to all of the peripheral devices.

This occurs by simply connecting the laptop computer to the docking station, which is already connected to the peripheral devices. However, conventional docking stations are generally not sufficiently robust for effectively operate in non-conventional and rugged environments. Therefore, it would be beneficial for a computer docking station to be configured for rugged environments and applications and to protect the attached computer and peripheral devices.

SUMMARY

In view of the foregoing, various exemplary embodiments herein provide a computer docking station having an enclosure unit, a cable-to-panel connector, a dock cover, an electrical connector that includes an open box configuration; and a cable-to-panel component. The enclosure unit connects to the docking station. The dock cover is disposed inside the enclosure unit.

In various exemplary embodiments, the electrical connector is also disposed inside the enclosure unit and connects to the dock cover. The electrical connector comprises connectors to enable electrical connections to peripheral devices, a mounting plate positioned over the enclosure unit, a docking connector operatively connected to the dock cover and extending through the mounting plate, and a plurality of gaskets connected to the mounting plate These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIG. 3B is a top view of the computer maintenance docking system of FIG. 3A according to an embodiment herein;

FIG. 3C is a side view of the computer maintenance docking system of FIG. 3B according to an embodiment herein;

FIG. 3D is a bottom view of the computer maintenance docking system of FIG. 3B according to an embodiment herein;

FIG. 4 is a perspective view of a docking system enclosure unit according to an embodiment herein;

DETAILED DESCRIPTION OF PREFERRED EMBODIMENTS

Figure 1:
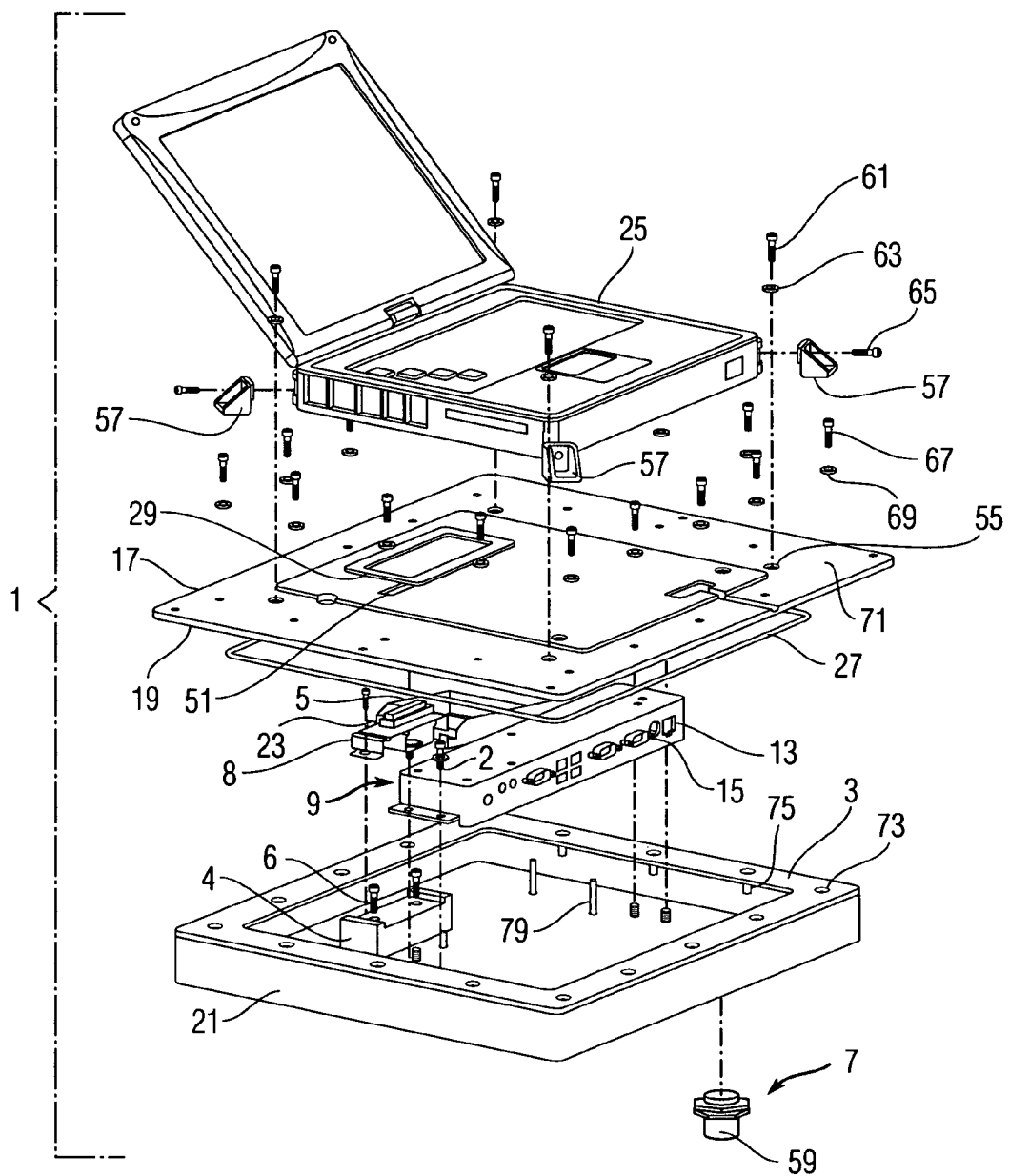
FIG. 1 is an exploded view of a computer maintenance docking system according to an embodiment herein.
Figure 2:
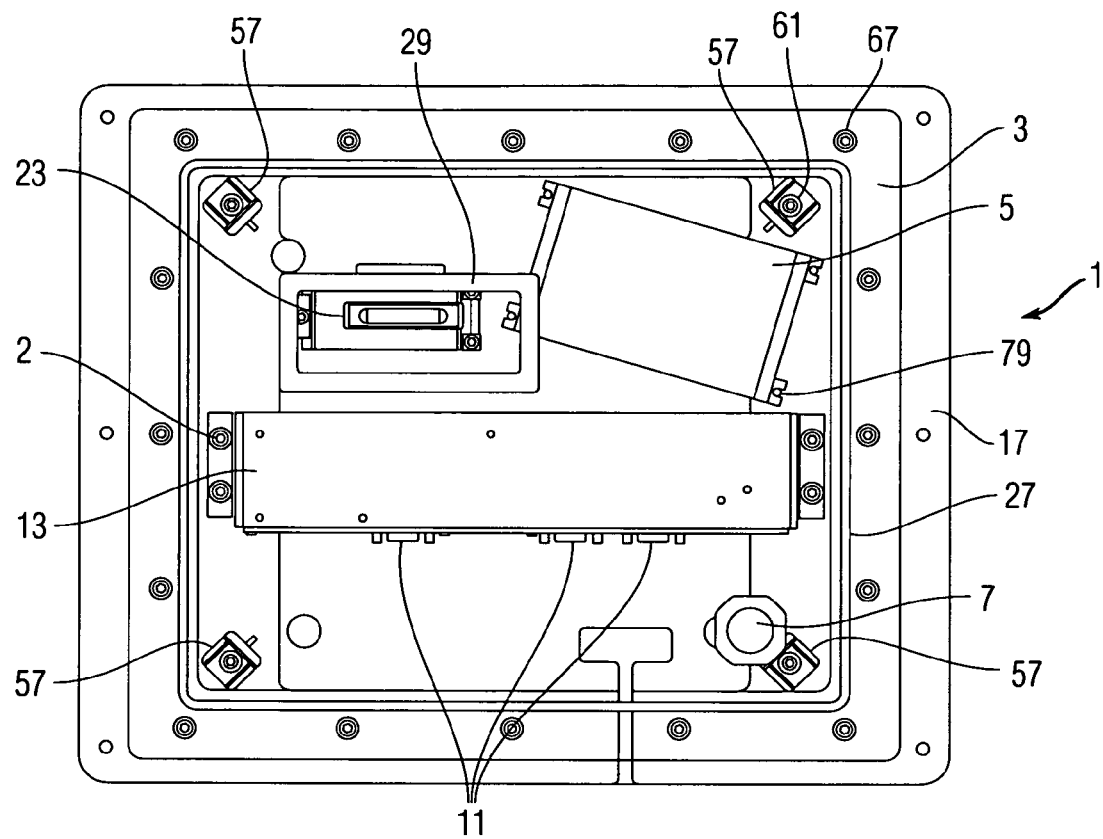
FIG. 2 is a top transparent view of the internal components of a computer maintenance docking system according to an embodiment herein.
Figure 3A:
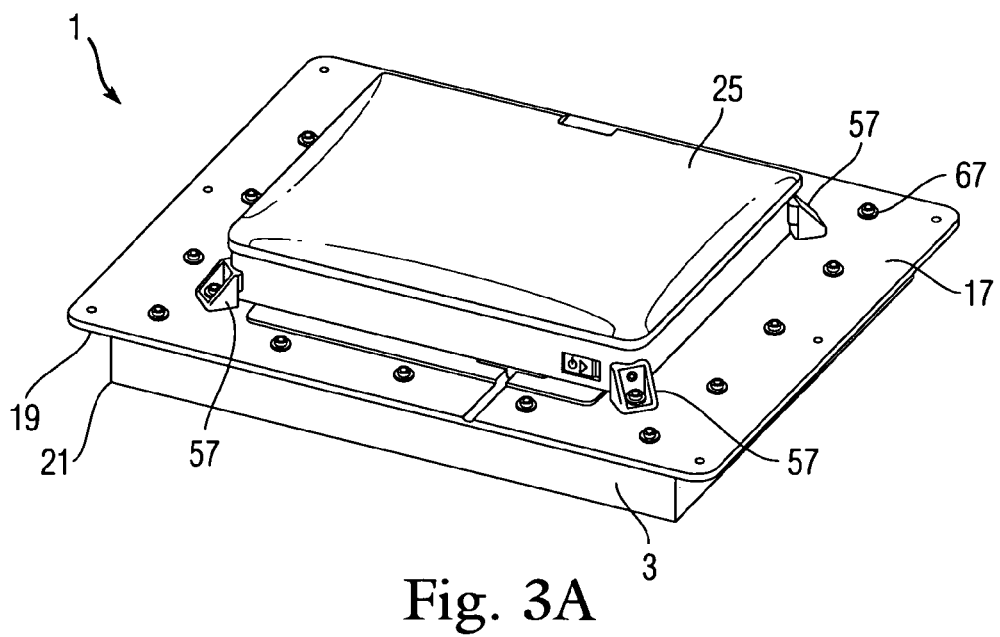
FIG. 3A is a perspective view of a computer maintenance docking system according to an embodiment herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein provide a water resistant computer docking station that includes a sealed enclosure that docks to a rugged laptop to break out power and network connectivity to military and other style connectors such that the system can be bolted down and connected without being damaged by environmental effects such as moisture. Referring now to the drawings, and more particularly to FIGS. 1 through 6, where similar reference characters denote corresponding features consistently throughout the figures, there are shown preferred embodiments.

FIGS. 1 through 3D are various views of a computer maintenance docking system 1 according to an embodiment herein. The computer docking system 1 comprises an enclosure unit 3 comprising an open box configuration, a DC-DC power converter unit 5 housed in the enclosure unit 3, a cable-to-panel connector 7 connected to the enclosure unit 3, and an electrical component 9 positioned inside the enclosure unit 3 and inside a dock cover 13, wherein the electrical component 9 comprises connectors 11 to allow electrical connections to peripheral devices (not shown). The dock cover 13 is positioned inside the enclosure unit 3 and houses the electrical component 9, wherein the dock cover 13 comprises a plurality of apertures 15 (best seen in FIG. 6) that align with the connectors 11 of the electrical component 9.

A mounting plate 17 is positioned over the enclosure unit 3, the electrical component 9, and the dock cover 13, wherein edges 19 of the mounting plate 17 overhang edges 21 of the enclosure unit 3. A docking connector 23 is operatively connected to the dock cover 13 and further extends through the mounting plate 17. A computer 25 attaches to the mounting plate 17 and the docking connector 23. A first gasket 27 is positioned in between the enclosure unit 3 and the mounting plate 17, and a second gasket 29 is positioned between the mounting plate 17 and the computer 25. The computer 25 may include a laptop computer.

A connection mechanism 57 attaches to the mounting plate 17 which allows the mounting plate 17 to attach to the computer 25. The cable-to-panel connector 7 comprises a single connection port 59 for power and computer networking cables (not shown). For example, cable-to-panel connector 7 may include type 38999 connectors.

As shown in FIG. 4, with reference to FIGS. 1 through 3D, the enclosure unit 3 comprises a base 31, a plurality of walls 33 extending upward from the base 31; and a top 35 positioned over the plurality of walls 33, wherein the top 35 comprises a framed configuration having an open central area 37, and wherein the framed portion 39 of the top 35 overhangs the base 31.

Figure 5:
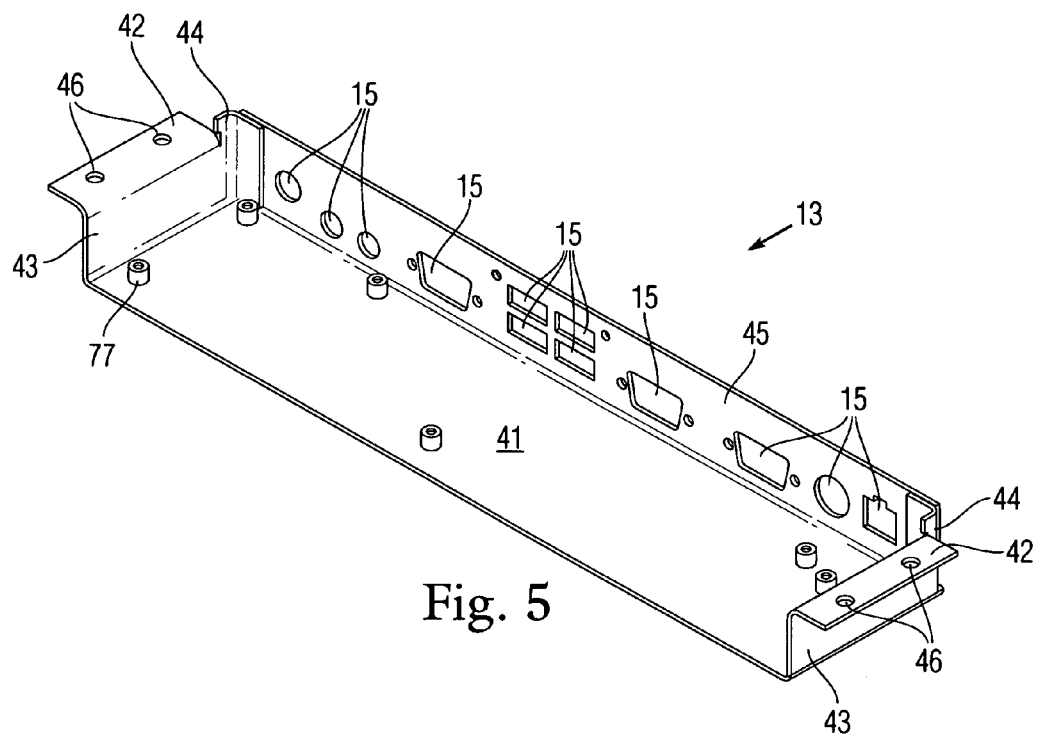
FIG. 5 is a perspective view of a docking system cover according to an embodiment herein.

As shown in FIG. 5, with reference to FIGS. 1 through 4, the dock cover 13 comprises a base 41, a plurality of side walls 43 opposed to one another, and a single elongated back wall 45 connecting to each of the side walls 43, wherein the back wall 45 comprises the plurality of apertures 15. Each side wall 43 is substantially shorter in height than the back wall 45 and includes a bracket 42 that is positioned transverse to the side wall 43 such that the bracket 42 is positioned on top of substantially all of the side wall 43 except for a small portion 44 that extends to a height of the back wall 45.

Figure 6:
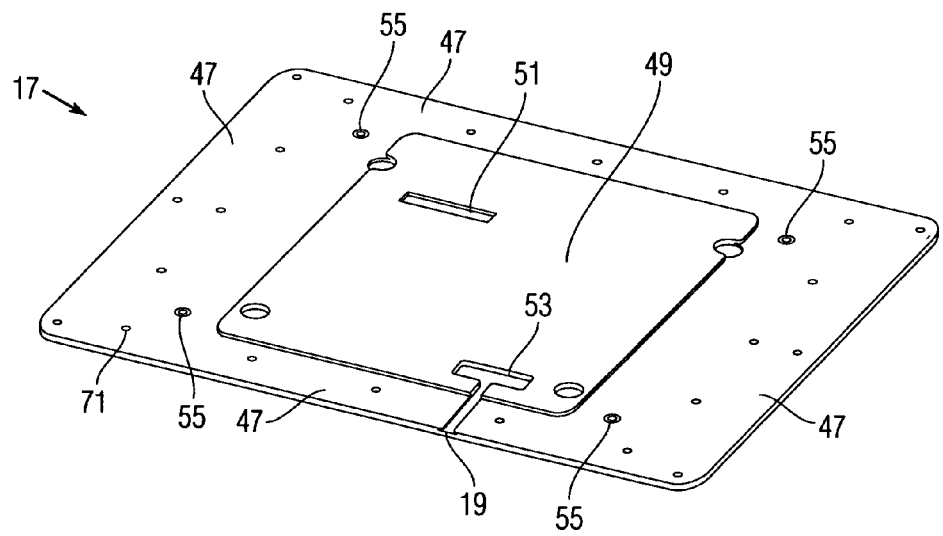
FIG. 6 is a perspective view of a docking system mounting plate according to an embodiment herein.

As shown in FIG. 6, with reference to FIGS. 1 through 5, the mounting plate 17 comprises an outer rim area 47, a raised inner area 49 substantially centrally located on a first side 51 of the mounting plate 17 and bounding the outer rim area 47, wherein the raised inner area 49 comprises an aperture 51 to permit the docking connector 23 to extend therethrough and operatively connect to the computer 25. A recessed area 53 extends from the raised inner area 49 to an edge 19 of the outer rim area 47, wherein the recessed area 53 is recessed with respect to each of the outer rim area 47 and the raised inner area 49.

Several connection and retainer mechanisms are included to attach the various sub-components of the system 1 together. As described herein, reference to retainer mechanisms may include nuts or any type of mechanism used to connect and retain one member to another member, and the embodiments herein are not limited to any particular type or number of retainer mechanisms.

As described herein, reference to a fastener may include screws, bolts, nails, rivets, pegs, adhesives, or any type of mechanism used to faster one member to another member, and the embodiments herein are not limited to any particular type or number of fasteners. As described herein, reference to a load distribution member may include washers or any type of mechanism used to distribute the load of the fastener, and the embodiments herein are not limited to any particular type or number of load distribution members.

As shown in the various views of FIGS. 1 through 6, the mounting plate 17 includes a plurality of holes 55 that accommodate fastener 61, which are inserted into connection mechanism 57 and load distribution member 63. The connection mechanism 57 is attached to the computer 25 using fastener 65. Accordingly, connection mechanism 57 allows the mounting plate 17 to attach to the computer 25. Fastener 67 is inserted into load distribution member 69 and is then inserted through hole 71 of mounting plate 17, which is then aligned with hole 73 of the enclosure unit 3 and is engaged with the retainer mechanism 75 that is attached underneath each hole 73 of the enclosure unit 3.

This permits the mounting plate 17 to attach to the enclosure unit 3. A stand 4 is attached to the base 31 of the enclosure unit 3 using fastener 6, which is engaged with retainer mechanism 38 of the enclosure unit 3. A platform 8 attaches to the docking connector 23 and is positioned on the stand 4 to permit elevation of the docking connector 23 through the aperture 51 of the mounting plate and into contact with the computer 25. Fastener 2 is inserted through hole 46 of the bracket 42 of the dock cover 13 and engage retainer mechanism 36 located on the base 31 of the enclosure unit 3. This permits the dock cover 13 to attach to the enclosure unit 3. Retainer mechanism 77 is used to retain electrical component 9 to the dock cover 13. Fastener 79 is used to retain the DC-DC power converter unit 5 to the enclosure unit 3.

The embodiments herein can be applied to ruggedized computing needs of the military and other commercial and industrial uses. The system 1 allows continuous use of rugged systems without compromising the environmental performance of that system 1. The embodiments herein overcome integration issues that arise from non-ruggedized computational equipment, and also provide a lighter (i.e., reduced weight) solution compared with conventional docking stations.

Moreover, the embodiments herein allow environmental ruggedness of the computer 25 to be maintained while peripherals and power are connected thereto. Generally, the embodiments herein permit the ability to use a ruggedized laptop computer 25 that can be fixed to a system with continuous connectivity to power and peripherals without compromising environmental seals or requiring users to connect or disconnect cables to operate.

The embodiments herein comprise a docking connector 23 and system 1 of a commercial off the shelf (CotS) docking station designed for a laptop computer 25. The system 1 is extracted and repackaged in a sealable enclosure unit 3 with the docking connector 23 penetrating the top surface of the mounting plate 17. A gasket 29 is placed around the docking connector 23, which seals when the laptop computer 25 is placed on top of the mounting plate 17.

Another gasket 27 allows the dock cover 13 and electrical component 9 as well as the DC-DC power converter unit 5 to become effectively sealed from the environment. The laptop computer 25 is then secured to the top of the mounting plate 17. The enclosure unit 3 and mounting plate 17 is configured to either enclose all devices needing a connection to the computer 25 or be connectable to allow for environmentally sealed connections to be made to external devices (not shown).

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:
1. A computer docking station comprising:
an enclosure unit comprising an open box configuration;

a cable-to-panel connector connected to said enclosure unit;
a dock cover positioned inside said enclosure unit;
an electrical component positioned inside said enclosure unit and connected to said dock cover, wherein said electrical component comprises connectors to allow electrical connections to peripheral devices;
a mounting plate positioned over said enclosure unit;
a docking connector operatively connected to said dock cover and extending through said mounting plate; and
a plurality of gaskets connected to said mounting plate;
wherein said mounting plate comprises:
an outer rim area; a raised inner area substantially centrally located on a first side of said mounting plate and bounding said outer rim area, wherein said raised inner area comprises an aperture to permit said docking connector to extend therethrough; and
a recessed area extending from said raised inner area to an edge of said outer rim area, wherein said recessed area is recessed with respect to each of said outer rim area and said raised inner area.

2. The computer docking station of claim 1, wherein said enclosure unit comprises:
a base;
a plurality of walls extending upward from said base; and
a top positioned over said plurality of walls, wherein said top comprises a framed configuration having an open central area, and wherein the framed portion of said top overhangs said base.

3. The computer docking station of claim 1, wherein said dock cover comprises:
a base;
a plurality of side walls opposed to one another; and
a single elongated back wall connecting to each of the side walls,
wherein the back wall comprises a plurality of apertures configured in a plurality of shapes.

4. The computer docking station of claim 3, wherein said plurality of apertures align with said connectors of said electrical component.

5. The computer docking station of claim 1, further comprising:
a connection mechanism that attaches to said mounting plate and is adapted to connect to a laptop computer; and
an aperture that aligns with said docking connector to allow said docking connector to extend through said mounting plate and connect to said laptop computer.

6. The computer docking station of claim 1, wherein said plurality of gaskets comprise:
a first gasket positioned in between said enclosure unit and said mounting plate; and
a second gasket positioned over said mounting plate.

7. The computer docking station of claim 1, further comprising a DC-DC power converter unit housed in said enclosure unit.

8. The computer docking station of claim 1, wherein said cable-to-panel connector comprises a single connection port for power and computer networking cables.

9. A computer docking system comprising:
an enclosure unit comprising an open box configuration;
a DC-DC power converter unit housed in said enclosure unit;
a cable-to-panel connector connected to said enclosure unit;
an electrical component positioned inside said enclosure unit, wherein said electrical component comprises connectors to allow electrical connections to peripheral devices;
a dock cover positioned inside said enclosure unit and housing said electrical component, wherein said dock cover comprises a plurality of apertures that align with said connectors of said electrical component;
a mounting plate positioned over said enclosure unit, said electrical component, and said dock cover, wherein edges of said mounting plate overhang edges of said enclosure unit;
a docking connector operatively connected to said dock cover and extending through said mounting plate;
a computer operatively connected to said mounting plate and said docking connector;
a first gasket positioned in between said enclosure unit and said mounting plate; and
a second gasket positioned between said mounting plate and said computer.

10. The system of claim 9, wherein said enclosure unit comprises:
a base;
a plurality of walls extending upward from said base; and
a top positioned over said plurality of walls, wherein said top comprises a framed configuration having an open central area, and wherein the framed portion of said top overhangs said base.

11. The system of claim 9, wherein said dock cover comprises:
a base;
a plurality of side walls opposed to one another; and
a single elongated back wall connecting to each of the side walls,
wherein the back wall comprises said plurality of apertures.

12. The system of claim 9, wherein said mounting plate comprises:
an outer rim area;
a raised inner area substantially centrally located on a first side of said mounting plate and bounding said outer rim area, wherein said raised inner area comprises an aperture to permit said docking connector to extend therethrough; and
a recessed area extending from said raised inner area to an edge of said outer rim area, wherein said recessed area is recessed with respect to each of said outer rim area and said raised inner area.

13. The system of claim 9, further comprising:
a connection mechanism that attaches said mounting plate to said computer; and
an aperture that aligns with said docking connector to allow said docking connector to extend through said mounting plate and operatively connect to said computer.

* * * * *